T. W. EATON.
Mechanical-Movement.

No. 215,810. Patented May 27, 1879

Witnesses:
A. W. Munday
Edmund Adcock

Inventor:
Thomas W. Eaton
by Munday & Evarts
his attys

UNITED STATES PATENT OFFICE.

THOMAS W. EATON, OF CHICAGO, ILLINOIS.

IMPROVEMENT IN MECHANICAL MOVEMENTS.

Specification forming part of Letters Patent No. 215,810, dated May 27, 1879; application filed April 21, 1879.

*To all whom it may concern:*

Be it known that I, THOMAS W. EATON, of Chicago, in the county of Cook and State of Illinois, have invented certain Improvements in Mechanical Movements, of which the following is a specification.

This invention relates to devices for converting continuous rotary motion into intermittent motion; and it consists, chiefly, in the combination, with a disk or other device to be intermittently operated, and having alternate projections and notches, whereby motion may be communicated to it, of a peculiar cam-wheel, which I term a "broken cam-wheel," because it operates as a cam through a portion only of its revolution, and which serves, during the balance of its revolution, to lock the intermittently-operated part against movement, the periphery of said wheel being provided with a spiral cam at one point adapted to enter said notches, and the balance of the rim being plain, and also adapted to enter said spaces, the cam giving the intermittent motion, and the plain rim serving as the lock, the disk being at all times under the influence of the wheel by the continuous passage of the wheel through some of the notches, and thus preventing that part against any movement whatever.

The invention is capable of numerous modifications, some of which are mentioned below.

Figure 1:
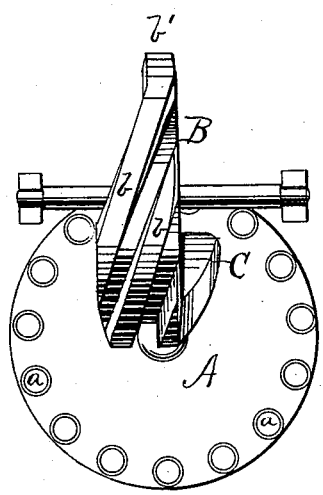
Figure 2:
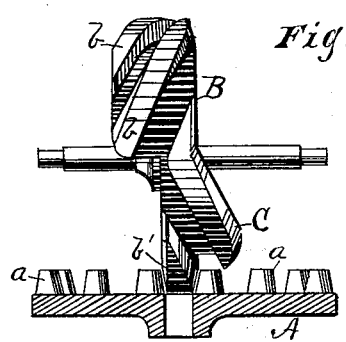
Figure 3:
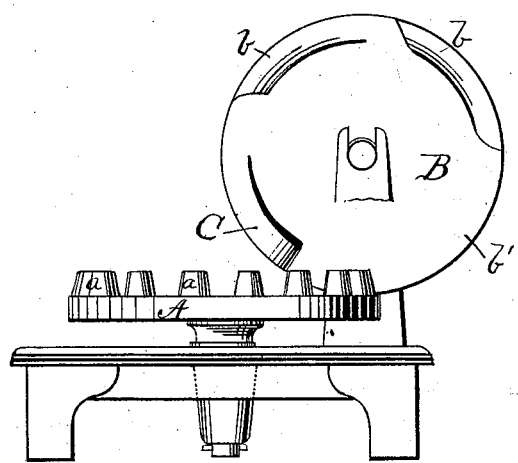

The accompanying drawings, forming a part of this specification, show, at Figure 1, a plan; at Fig. 2, a front elevation, partly in section, and at Fig. 3 a side elevation, of my improvement, similar letters indicating corresponding parts.

In said drawings, A represents a disk, designed to represent the part to which the intermittent motion is sought to be given. It may be mounted upon a shaft which bears the device for which that motion is intended, or it may itself be that device. It may rotate, as shown in the drawings, in which case, of course, it is mounted upon a pivot; or it may be a reciprocating or continuously-moving device instead of a rotary one, such as is illustrated. It is provided with projections or teeth $a$, placed at proper intervals, so that the desired frequency and length of movement for the disk may be obtained through them.

B is the peculiar cam-wheel mentioned. It is mounted upon a shaft, C, and continuously rotated. In the form shown in the drawings there are formed, at one part of its periphery, two spiral cams, $b\ b$, adapted to enter the spaces between the teeth. To obtain the necessary width, so that this cam portion of the wheel may communicate the necessary amount of movement, I build upon it a lateral extension, as shown. Both of the cams $b\ b$ are alike in kind and dimension, so that the action of each one is exactly like the operation of the other. Now, when the wheel B is rotated, the first of these cams enters between two adjacent teeth $a$, and imparts to the disk a partial rotation, the second cam entering the next notch or space, and continuing the rotation until the rim $b'$ of the wheel enters the third notch, at which time the cams will have passed their entire length through said spaces in the disk. From this point until the cams are reached again in due course the rim of the wheel, which likewise fits the spaces or notches between the teeth, continuously moves through one of said spaces, and acts as a stop to prevent further movement of the disk.

In the example shown the wheel is adapted to move the disk a distance equal to the width of two spaces and two teeth. By the use of a single spiral cam, however, this movement may be reduced one-half, as is obvious; and it is also obvious that by adding another cam like those shown the amount of movement would be increased one-half, and so on indefinitely; and my invention contemplates all these variations.

Another form of my invention consists in the addition to the cam-wheel described of an oppositely-operating cam or cams, whereby a reciprocating movement, both parts of which may be equal or unequal, is obtained, and I have shown one form of this branch of the invention in the drawings.

C is a single spiral cam, extending to the opposite side of the wheel from the cams already described, and placed relatively thereto, so that it begins to operate as soon as the cams $b\ b$ have ceased their function. It is constructed to move the disk back one notch, or one-half of the rotation just imparted to it by the other cams. It need not be so placed relatively to the forward-moving cams; but intervals may be given between the two movements, and the disk may be locked in the same manner during such intervals. Two or more cams may also be employed, and they may be equal to or vary from the forward cams, as is obvious. By reversing the wheel a still further change is produced, as that reverses the direction of the disk's rotation, and, when the oppositely-inclined cams are employed, reverses the order of the different movements.

By this construction of cam-wheel all jars and shocks, such as are common to pawl-and-ratchet and similar devices for converting motion, are avoided, and this is owing to the fact that the disk is at all times controlled and held firmly by the wheel, and also, perhaps, to the rounded conformation of the commencement of the cam portions.

I hereby claim as new—

The combination, with the disk or other device to be intermittently operated, and having appropriately-spaced notches, of a cam-wheel alternately moving and locking said disk or other device by the continuous passage of its cam or cams and plain rim through such spaces or notches, substantially as specified.

THOMAS W. EATON.

Witnesses:
EDW. S. EVARTS,
H. M. MUNDAY.